(12) United States Patent
Chakravarthi et al.

(10) Patent No.: US 11,948,259 B2
(45) Date of Patent: Apr. 2, 2024

(54) SYSTEM AND METHOD FOR PROCESSING AND INTERGRATING REAL-TIME ENVIRONMENT INSTANCES INTO VIRTUAL REALITY LIVE STREAMS

(71) Applicant: BANK OF AMERICA CORPORATION, Charlotte, NC (US)

(72) Inventors: Suryanarayan Parthasarathi Chakravarthi, Tamil Nadu (IN); Pritika Bhatia, Delhi (IN); Harshit Bhatt, Uttarakhand (IN); Saisrikanth Chitty, Telangana (IN); Neha Jain, Haryana (IN); Mithun Kumar, Uttar Pradesh (IN); Madhumitha Swaminathan Rangarajan, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 40 days.

(21) Appl. No.: 17/892,877

(22) Filed: Aug. 22, 2022

(65) Prior Publication Data
US 2024/0062477 A1 Feb. 22, 2024

(51) Int. Cl.
G06T 19/00 (2011.01)
H04N 21/2187 (2011.01)

(52) U.S. Cl.
CPC ....... *G06T 19/006* (2013.01); *H04N 21/2187* (2013.01)

(58) Field of Classification Search
CPC ................. G06T 19/006; H04N 21/2187
See application file for complete search history.

(56) References Cited

U.S. PATENT DOCUMENTS

| | | | |
|---|---|---|---|
| 7,693,702 B1 | 4/2010 | Kerner et al. | |
| 8,638,989 B2 | 1/2014 | Holz | |
| 9,215,293 B2 | 12/2015 | Miller | |
| 9,363,569 B1 | 6/2016 | Van Hoff et al. | |
| 9,669,321 B2 | 6/2017 | Reveley | |
| 2006/0150530 A1 | 7/2006 | Davey | |
| 2009/0325699 A1 | 12/2009 | Delgiannidis | |
| 2013/0218542 A1* | 8/2013 | Yerli | G06F 30/20 703/6 |
| 2014/0278065 A1* | 9/2014 | Ren | G06T 17/05 701/454 |
| 2016/0001175 A1 | 1/2016 | Aronzon et al. | |
| 2016/0004298 A1 | 1/2016 | Mazed et al. | |

(Continued)

Primary Examiner — Maurice L. McDowell, Jr.
(74) Attorney, Agent, or Firm — Moore & Van Allen PLLC; Nicholas C. Russell

(57) ABSTRACT

Embodiments of the present invention provide a system for processing and integrating real-time environment instances into virtual reality live streams. The system is configured for determining that a user is accessing a virtual environment, capturing real-time environment instance associated with the virtual environment via one or more capturing devices, creating a neutral environment template based on processing the real-time environment instance, embedding one or more preferential objects associated with the user into the neutral environment template to generate a preferred environment template, and instantaneously integrating the preferred environment template into a virtual reality live stream associated with the virtual environment in real-time.

20 Claims, 10 Drawing Sheets

(56) References Cited

U.S. PATENT DOCUMENTS

| | | |
|---|---|---|
| 2016/0225188 A1 | 8/2016 | Ruddell et al. |
| 2016/0275722 A1 | 9/2016 | Bretschneider et al. |
| 2017/0109940 A1* | 4/2017 | Guo ........................ G06T 7/30 |
| 2017/0124767 A1 | 5/2017 | Foust |
| 2017/0261745 A1 | 9/2017 | Fitzgerald et al. |
| 2017/0285733 A1 | 10/2017 | Bretschneider et al. |
| 2018/0144525 A1 | 5/2018 | Gutierrez et al. |
| 2018/0332317 A1* | 11/2018 | Song ................... H04N 13/344 |
| 2021/0192802 A1* | 6/2021 | Nepveu ................ H04N 13/194 |

\* cited by examiner

SYSTEM AND METHOD FOR PROCESSING AND INTERGRATING REAL-TIME ENVIRONMENT INSTANCES INTO VIRTUAL REALITY LIVE STREAMS

BACKGROUND

Conventional systems do not have the capability to integrate real-time instances into virtual reality live streams. As such, there exists a need for a system for processing and integrating real-time environment instances into virtual reality live streams.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of embodiments in a summary form as a prelude to the more detailed description that follows.

Embodiments of the present invention address the above needs and/or achieve other advantages by providing apparatuses (e.g., a system, computer program product and/or other devices) and methods for processing and integrating real-time environment instances into virtual reality live streams. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention determines that a user is accessing a virtual environment, captures real-time environment instance associated with the virtual environment via one or more capturing devices, wherein the real-time environment instance comprises at least a front view and a side view, embosses the front view of the real-time environment instance onto a first concave grid, embosses the side view of the real-time environment instance onto a second concave grid, merges the first concave grid and the second concave grid to process the real-time environment instance, creates a neutral environment template based on processing the real-time environment instance, embeds one or more preferential objects associated with the user into the neutral environment template to generate a preferred environment template, and instantaneously integrates the preferred environment template into a virtual reality live stream associated with the virtual environment in real-time.

In some embodiments, the present invention processes the real-time environment instance based on identifying one or more elements in the real-time environment instance, optimizing at least one element of the one or more elements that is not in field of view of the user in the virtual environment, and eliminating at least one other element based on user preferences of the user. In some embodiments, the present invention embeds the one or more preferential objects in space associated with the at least one other element that is eliminated based on the user preferences of the user. In some embodiments, the present invention embeds the one or more preferential objects in the space based on performing grid oriented element warping and grid oriented element positioning.

In some embodiments, the present invention embeds the one or more preferential objects with a higher negative 'Z' axis value, where the higher negative 'Z' axis value indicates that the one or more preferential objects are embedded based on 'grid within a grid' rendering in the virtual environment.

In some embodiments, the present invention processes the one or more preferential objects and stores the one or more preferential objects in object templates based on processing the one or more preferential objects, wherein the object templates allow for efficient integration of the one or more preferential objects into the neutral environment template.

In some embodiments, the one or more capturing devices comprise at least two cameras, wherein the at least two cameras are 360 degree cameras.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
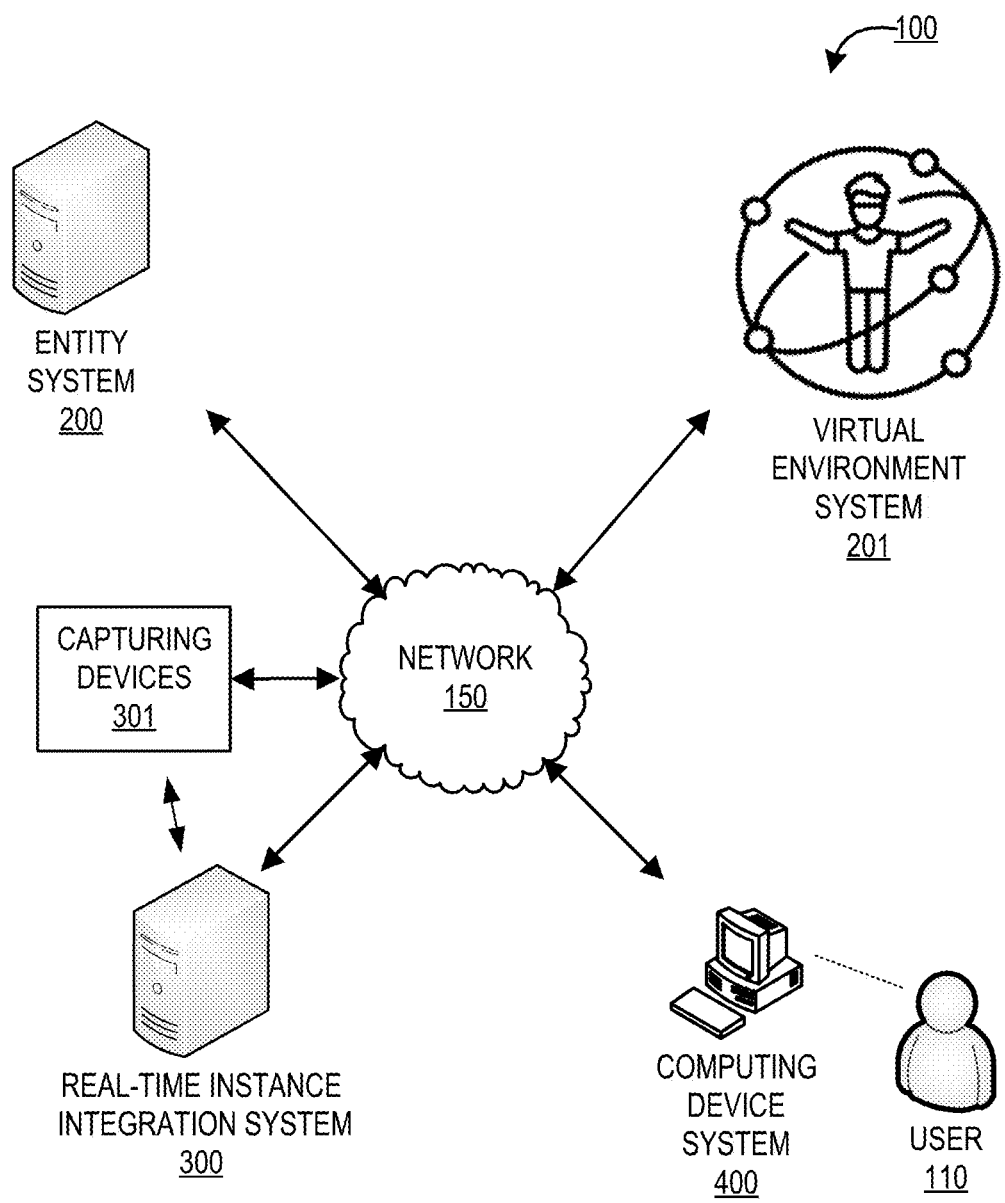
Figure 2:
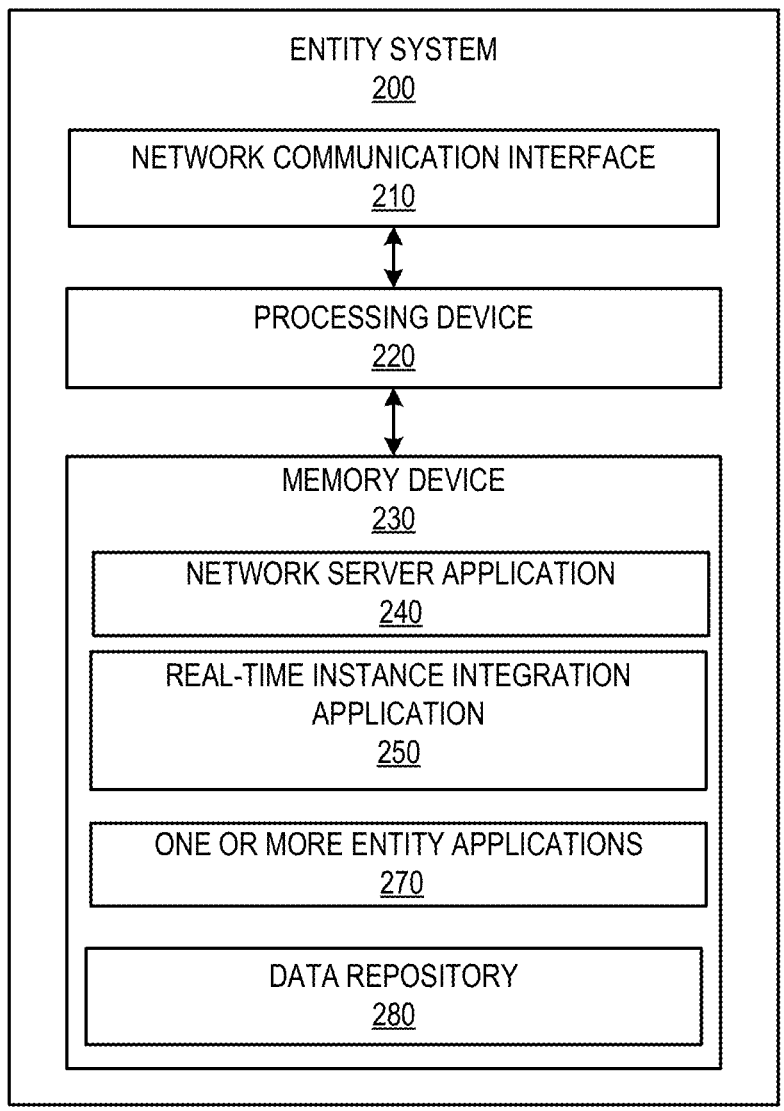
Figure 3:
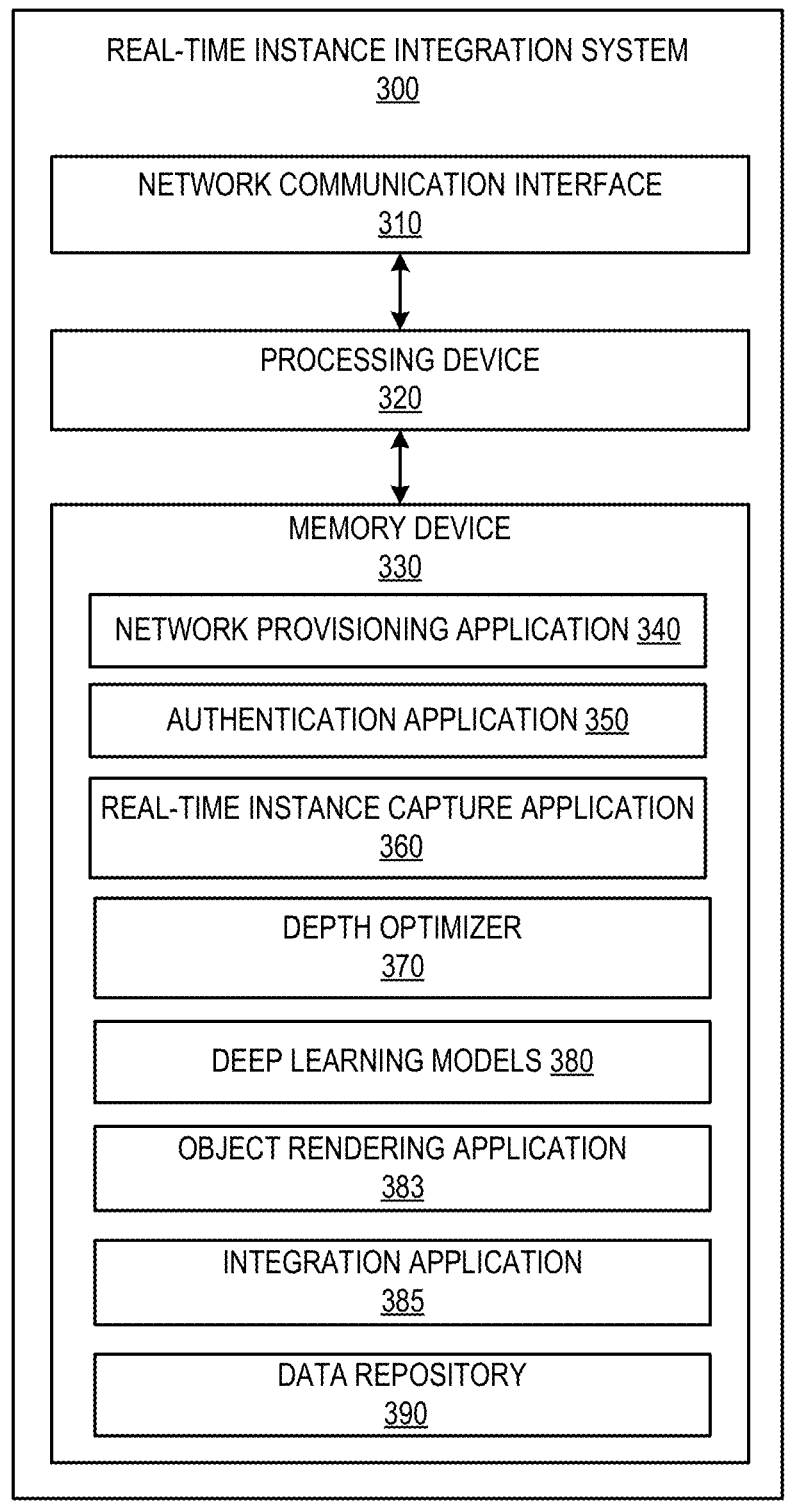
Figure 4:
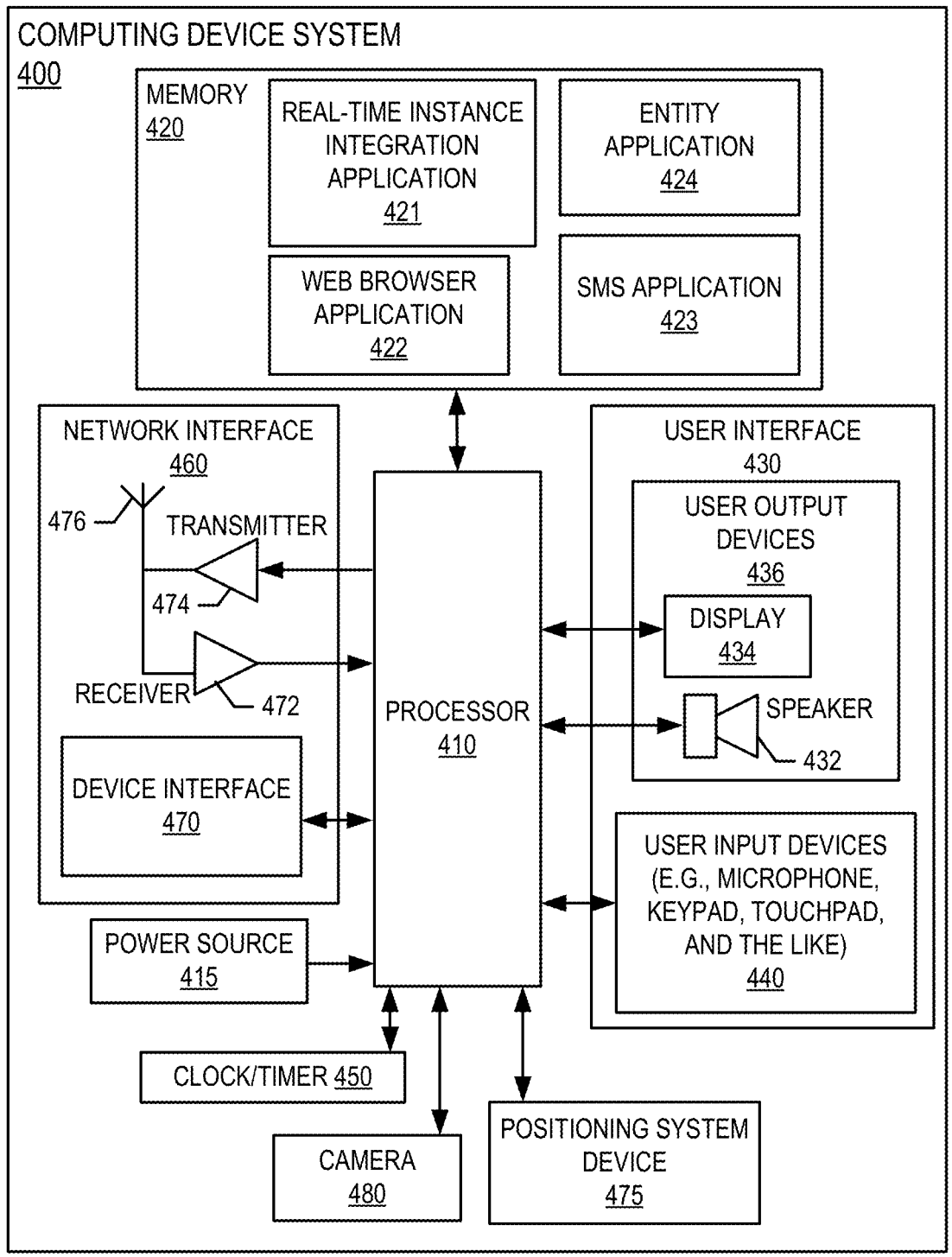
Figure 5:
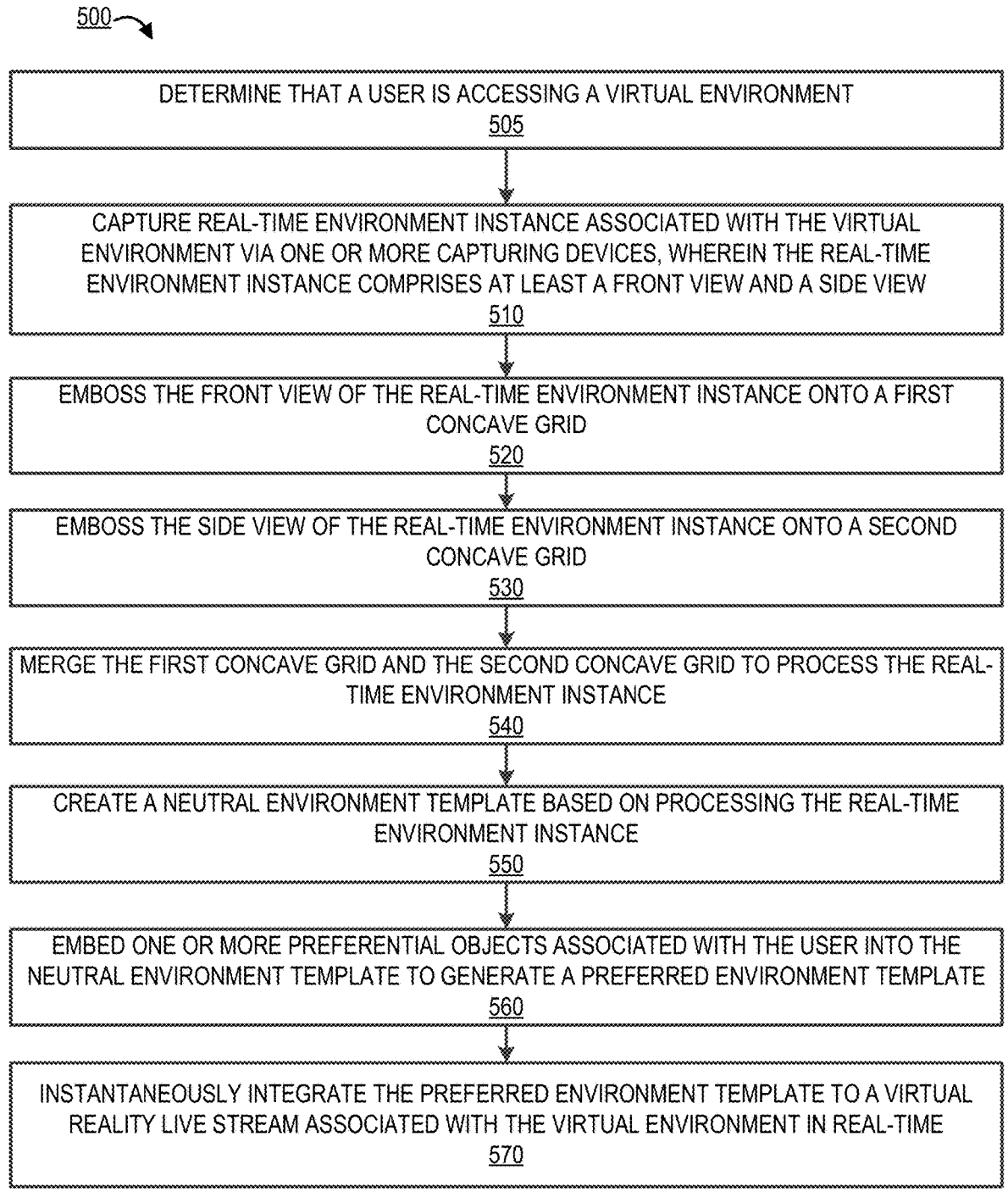
Figure 6:
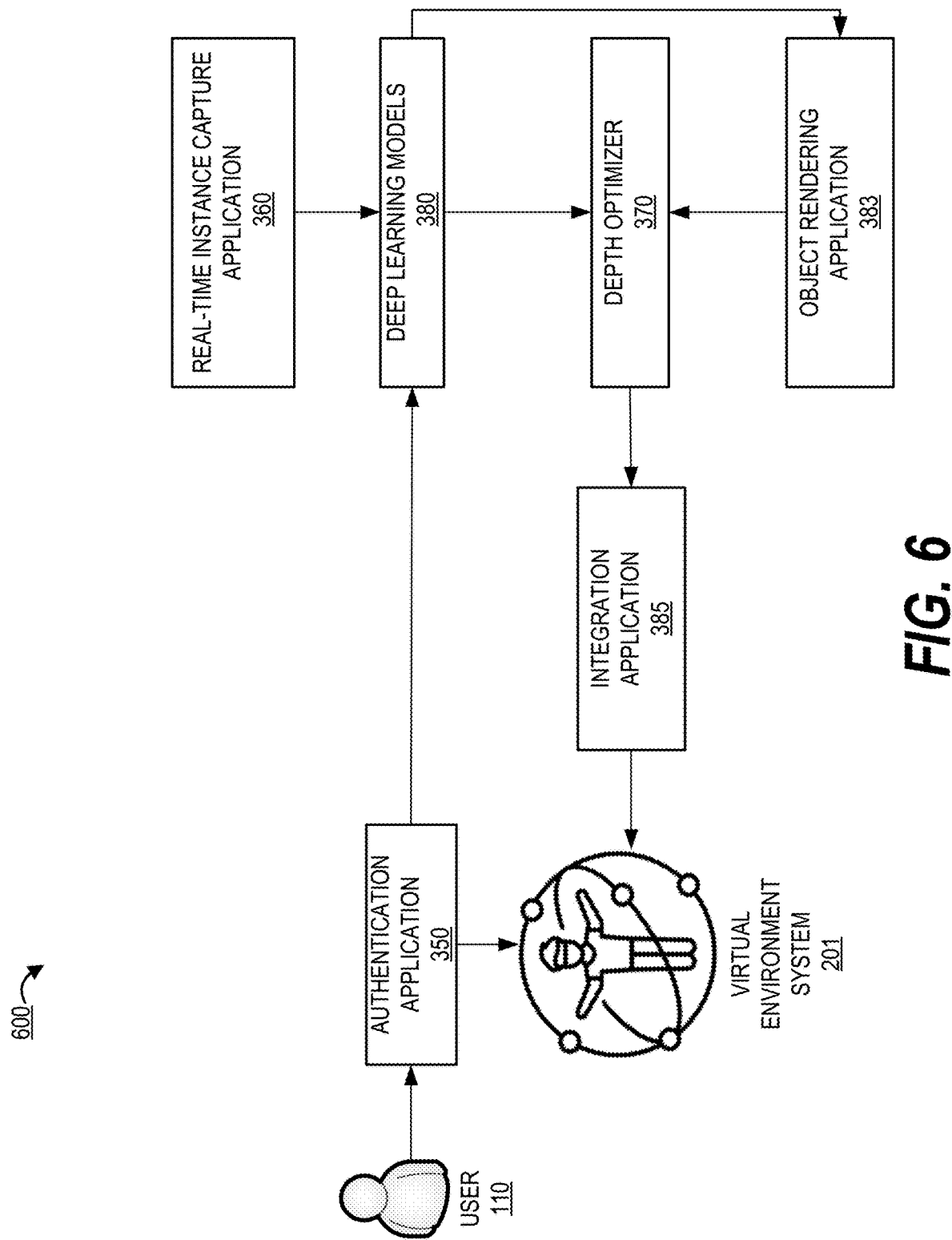
Figure 8A:
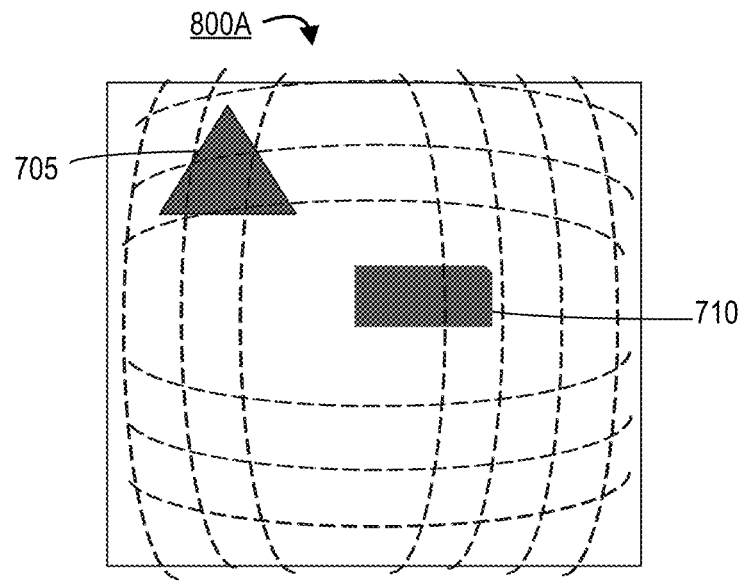
Figure 8B:
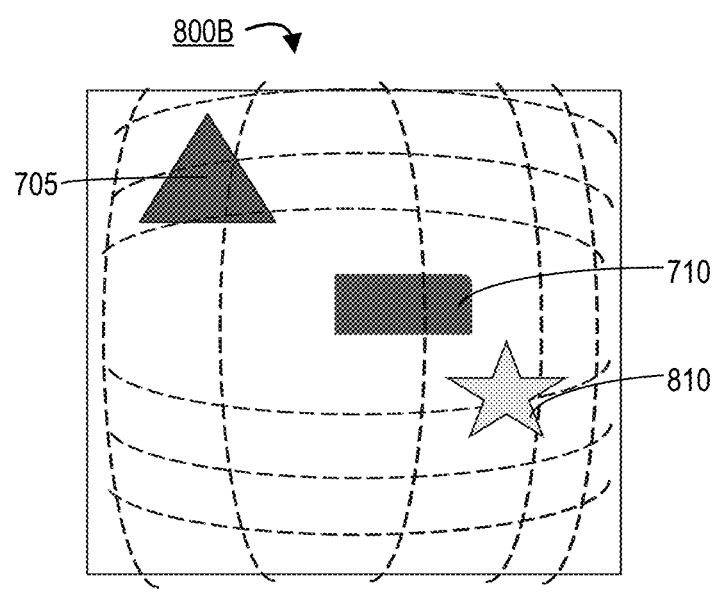
Figure 9:
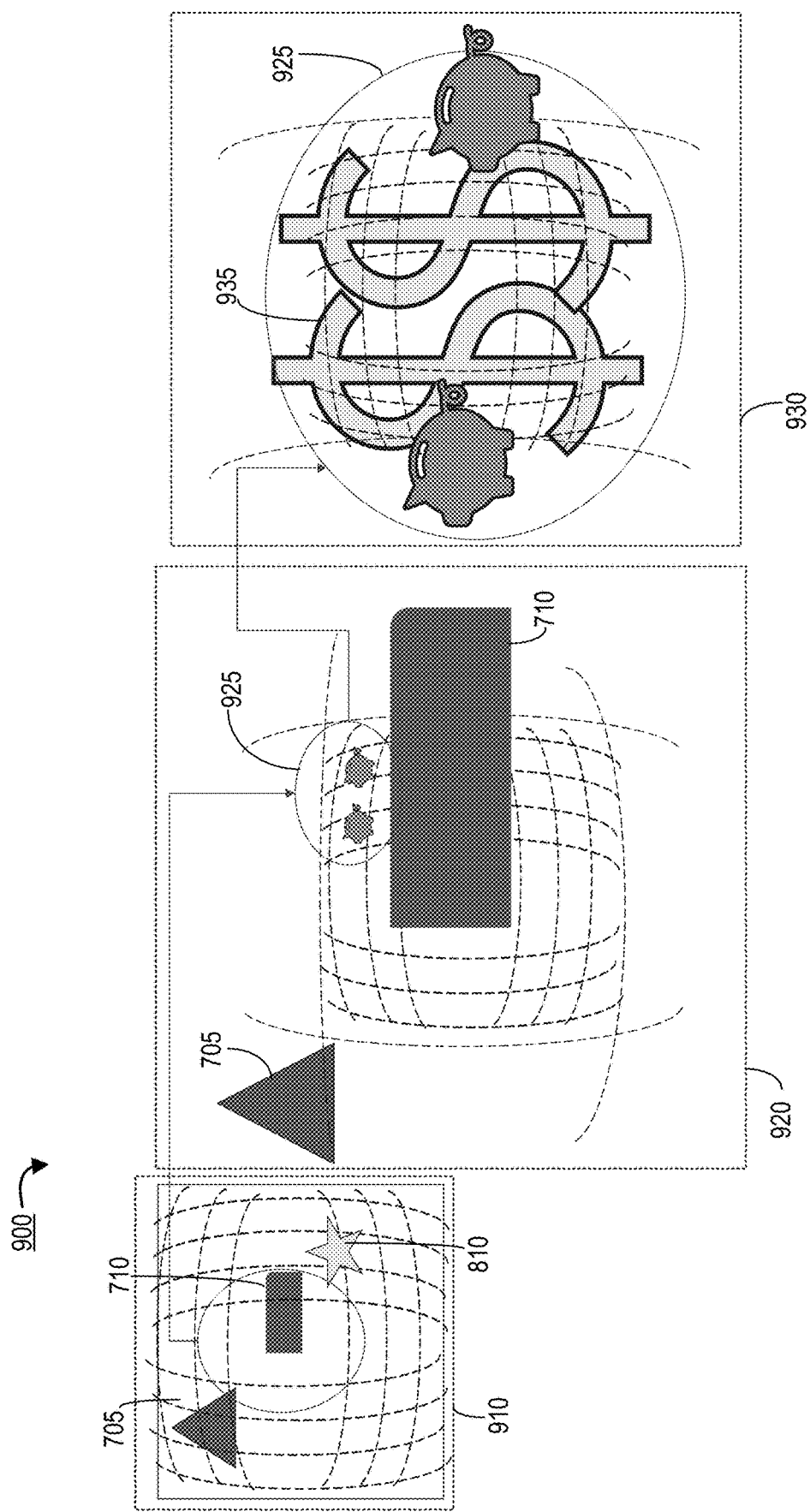

Having thus described embodiments of the invention in general terms, reference will now be made the accompanying drawings, wherein:

FIG. 1 provides a block diagram illustrating a system environment for processing and integrating real-time environment instances into virtual reality live streams, in accordance with an embodiment of the invention;

FIG. 2 provides a block diagram illustrating the entity system 200 of FIG. 1, in accordance with an embodiment of the invention;

FIG. 3 provides a block diagram illustrating a real-time instance integration system 300 of FIG. 1, in accordance with an embodiment of the invention;

FIG. 4 provides a block diagram illustrating the computing device system 400 of FIG. 1, in accordance with an embodiment of the invention;

FIG. 5 provides a process flow for processing and integrating real-time environment instances into virtual reality live streams, in accordance with an embodiment of the invention;

FIG. 6 provides a block diagram illustrating the process of processing and integrating real-time environment instances into virtual reality live streams, in accordance with an embodiment of the invention;

FIGS. 7A-7G provide grid representations of processing real-time time environment instance captured by one or more capturing devices, in accordance with an embodiment of the invention;

FIGS. 8A and 8B provide grid representations of replacing one or more elements in the real-time environment instance captured by the one or more capturing devices with one or more preferential objects, in accordance with an embodiment of the invention; and FIG. 9 provides a grid representation for embedding the one or more preferential objects using a 'grid within a grid' approach, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, a digital ecosystem is a hypothetical iteration of the Internet as a single, universal and immersive virtual environment that is facilitated by the use of virtual reality and augmented reality devices. Thus, digital ecosystem provides the ability for a user to associate with an avatar (i.e., a virtual representation/object of the user) and for the avatar to perform one or more actions (e.g., resource exchange events, purchase of products, or the like) within a virtual environment. An example of such a digital ecosystem is a Metaverse.

As described herein, the term "entity" may be any entity registered on a Metaverse to conduct one or more operations. In some embodiments, the entity may be a financial institution which may include herein may include any financial institutions such as commercial banks, thrifts, federal and state savings banks, savings and loan associations, credit unions, investment companies, insurance companies and the like. In some embodiments, the entity may be a non-financial institution such as an auto dealer, retail store, department store, pharmacy, hospital, or the like.

Many of the example embodiments and implementations described herein contemplate interactions engaged in by a user with a computing device and/or one or more communication devices and/or secondary communication devices. A "user", as referenced herein, may refer to a customer of the entity. In some embodiments, the term "user" may refer to a potential customer of the entity. Furthermore, as used herein, the term "user computing device" or "mobile device" may refer to augmented reality devices, virtual reality devices, mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

FIG. 1 provides a block diagram illustrating a system environment 100 for processing and integrating real-time environment instances into virtual reality live streams, in accordance with an embodiment of the invention. As illustrated in FIG. 1, the environment 100 includes a real-time instance integration system 300, an entity system 200, a computing device system 400, one or more capturing devices 301, and a virtual environment system 201. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200. In some embodiments, the one or more users 110 may be potential customers of the entity associated with the entity system 200. In some embodiments, the one or more users 110 may not be customers of the entity. In some embodiments, the one or more users 110 may be users of the virtual environment system 201.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that is part of a digital universe, such as a Metaverse.

The virtual environment system 201 may be one or more systems that provide access to one or more digital ecosystems associated with one or more entities and also maintain and manage the one or more digital ecosystems associated with the one or more entities. In some embodiments, the virtual environment system 201 may be a part of the entity system 200, where the entity system 200 provides access, manages, maintains, controls, and/or the like a digital ecosystem associated with the entity. As such, there may be multiple entity systems and/or virtual environment systems associated with the one or more entities that have digital ecosystems set up in the virtual environment.

The real-time instance integration system 300 is a system of the present invention for performing one or more process steps described herein. In some embodiments, the real-time instance integration system 300 may be an independent system. In some embodiments, the real-time instance integration system 300 may be a part of the entity system 200. In some embodiments, the real-time instance integration system 300 may be controlled, owned, managed, and/or maintained by the entity associated with the entity system 200. The one or more capturing devices 301 may be any video and audio capturing devices configured to capture real-time environment instances. In some embodiments, the one or more capturing devices 301 may be cameras. In some such embodiments, the cameras may be 360 degree cameras. In some embodiments, the present invention uses at least two 360 degree cameras, where a first camera is configured to capture a side view and a second camera is configured to capture a front view of the real-time environment instance.

The real-time instance integration system 300, the entity system 200, the computing device system 400, the one or more capturing devices 301, and the virtual environment system 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the real-time instance integration system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the real-time instance integration system 300, and/or entity system 200 across the network 150. In some exemplary embodiments of the invention, the computing device system 400 may be Virtual Reality glasses, virtual reality headsets, a desktop computer, smartphone, Augmented Reality glasses, Virtual Reality gloves, wrist-based bands, and/or any other devices used to access a digital universe.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution or a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a real-time instance integration application 250, one or more entity applications 270, and a data repository 280 comprising historical transaction data, historical product level data associated with one or more transactions performed by the users, and the like. The one or more entity applications 270 may be any applications developed, supported, maintained, utilized, and/or controlled by the entity. The computer-executable program code of the network server application 240, the real-time instance integration application 250, the one or more entity application 270 to perform certain logic, data-extraction, and data-storing functions of the entity system 200 described herein, as well as communication functions of the entity system 200.

The network server application 240, the real-time instance integration application 250, and the one or more entity applications 270 are configured to store data in the data repository 280 or to use the data stored in the data repository 280 when communicating through the network communication interface 210 with the real-time instance integration system 300, and/or the computing device system 400 to perform one or more process steps described herein. In some embodiments, the entity system 200 may receive instructions from the real-time instance integration system 300 via the real-time instance integration application 250 to perform certain operations. The real-time instance integration application 250 may be provided by the real-time instance integration system 300. The one or more entity applications 270 may be any of the applications used, created, modified, facilitated, developed, and/or managed by the entity system 200.

FIG. 3 provides a block diagram illustrating the real-time instance integration system 300 in greater detail, in accordance with embodiments of the invention. As illustrated in FIG. 3, in one embodiment of the invention, the real-time instance integration system 300 includes one or more processing devices 320 operatively coupled to a network communication interface 310 and a memory device 330. In certain embodiments, the real-time instance integration system 300 is operated by an entity, such as a financial institution. In other embodiments, the real-time instance integration system 300 is operated by a non-financial institution. In some embodiments, the real-time instance integration system 300 is owned or operated by the entity of the entity system 200. In some embodiments, the real-time instance integration system 300 may be an independent system. In alternate embodiments, the real-time instance integration system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the real-time instance integration system 300 described herein. For example, in one embodiment of the real-time instance integration system 300, the memory device 330 includes, but is not limited to, a network provisioning application 340, an authentication application 350, a real-time instance capturing application 360, a depth optimizer 370, deep learning models 380, an object rendering application 383, an integration application 385, and a data repository 390 comprising any data processed or accessed by one or more applications in the memory device 330. The computer-executable program code of the network provisioning application 340, the authentication application 350, the real-time instance capturing application 360, the depth optimizer 370, the learning models 380, the object rendering application 383, and the integration application 385 may instruct the processing device 320 to perform certain logic, data-processing, and data-storing functions of the real-time instance integration system 300 described herein, as well as communication functions of the real-time instance integration system 300.

The network provisioning application 340, the authentication application 350, the real-time instance capturing application 360, the depth optimizer 370, the learning models 380, the object rendering application 383, and the integration application 385 are configured to invoke or use the data in the data repository 390 when communicating through the network communication interface 310 with the entity system 200, and/or the computing device system 400. In some embodiments, the network provisioning application 340, the authentication application 350, the real-time instance capturing application 360, the depth optimizer 370, the learning models 380, the object rendering application 383, and the integration application 385 may store the data extracted or received from the entity system 200, and the computing device system 400 in the data repository 390. In some embodiments, the network provisioning application 340, the authentication application 350, the real-time instance capturing application 360, the depth optimizer 370, the learning models 380, the object rendering application 383, and the integration application 385 may be a part of a single application (e.g., modules).

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touch-pad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a real-time instance integration application 421, entity application 424. These applications also typically instructions to a graphical user interface (GUI) on the display 430 that allows the user 110 to interact with the entity system 200, the real-time instance integration system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the real-time instance integration application 421 provided by the real-time instance integration system 300 allows the user 110 to access the real-time instance integration system 300. In some embodiments, the entity application 424 provided by the entity system 200 and the real-time instance integration application 421 allow the user 110 to access the functionalities provided by the real-time instance integration system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a process flow for processing and integrating real-time environment instances into virtual reality live streams, in accordance with an embodiment of the invention. As shown in block 505, the system determines that a user is accessing a virtual environment. In some embodiments, the user may be a customer, employee, or the like associated with the entity. In some embodiments, the user may be a potential customer of the entity. In some embodiments, the user may be a user of a digital universe (e.g., Metaverse). The user may use any of the devices used to access the digital universe, where the devices may include, but are not limited to, Virtual Reality glasses, virtual reality headsets, a desktop computer, smartphone, Augmented Reality glasses, Virtual Reality gloves, wrist-based bands, and/or like.

The user may use any of the devices mentioned above to submit a request to gain access to the virtual environment. Upon receiving the request, the system of the invention and/or the entity system may authenticate the user using any of the available authentication methods, retrieve one or more preferences of the user from a data repository (e.g., data repository 390 or data repository 290), and prompt the user to provide additional inputs associated with the preferences of the user, where the additional inputs may be related to the type of virtual environment that the user is gaining access to. After gathering the additional inputs, the system may store or update the database with the additional inputs. While performing the step of authentication, the system may parallelly perform the steps of gathering user preferences and all of the steps disclosed below. Therefore, the time from when the user submitted the request to when the user is presented a preferential virtual environment as discussed in block 570 is instantaneous.

As shown in block 510, the system captures real-time environment instance associated with the virtual environment via one or more capturing devices, wherein the real-time environment instance comprises at least a front view and a side view. The system may communicate with the one or more capturing devices and may control the one or more capturing devices to cause the one or more capturing devices to capture a real-time environment instance associated with a live scene. The one or more capturing devices used herein may be a camera, where the camera is a 360 degree viewing camera. In some embodiments, the system may use at least two cameras, where a first camera is used to capture a side view and a second camera is used to capture a front view of the live scene. The live scene may be associated with any entity such as a financial center, a car dealership, a mall, and/or the like. The system may cause the one or more capturing devices to capture both audio and video associated with the live scene.

As shown in block 520, the system embosses the front view of the real-time environment instance onto a first concave grid. As shown in block 530, the system embosses the side view of the real-time environment instance onto a second concave grid. Embossing the front view and the side view of the real-time environment instance is discussed in detail in FIGS. 7A-7D. It should be understood that the elements and objects illustrated in FIGS. 7A through 7G are examples described for explanatory purposes only and in no way delineate the scope of the invention.

Figure 7A:
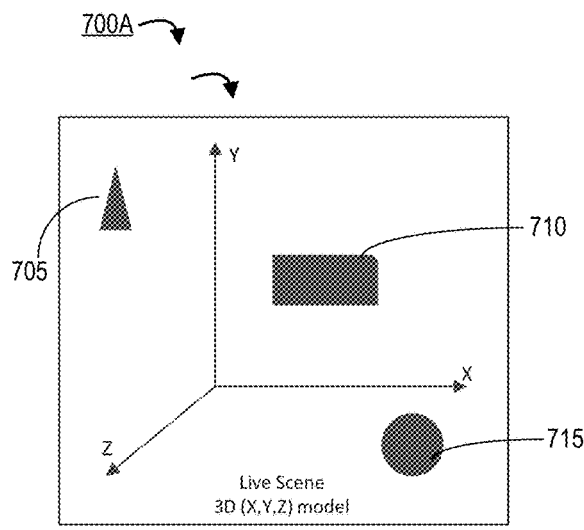
Figure 7B:
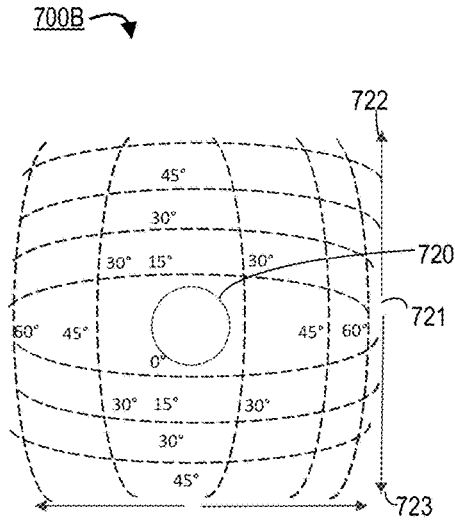
Figure 7C:
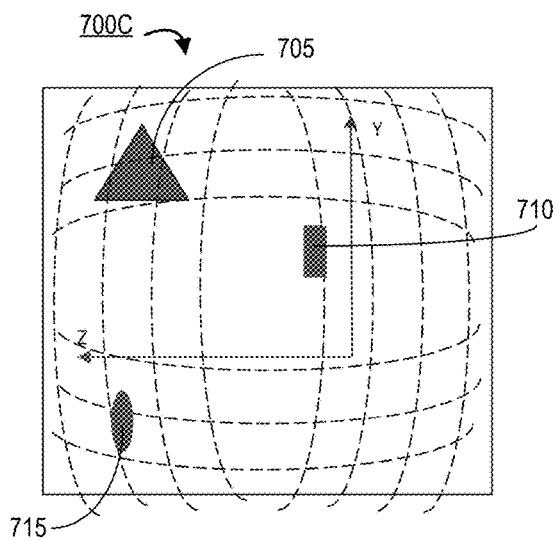
Figure 7D:
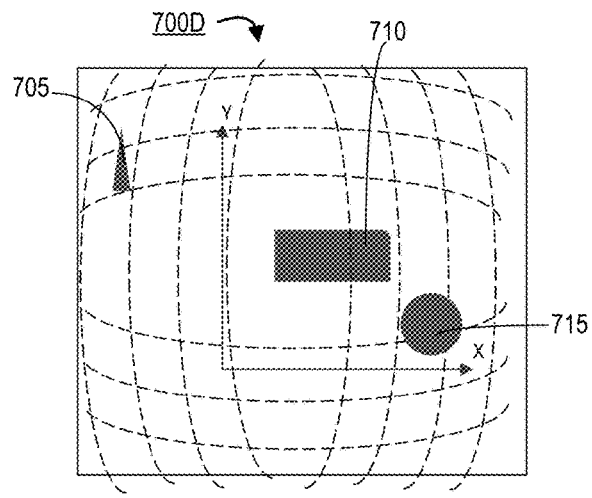

FIG. 7A illustrates an example real-time environment instance captured by the one or more capturing devices in block 510, where the environment instance is represented on X, Y, and Z axis. As shown, the real-time environment instance comprises a triangle 705, a rectangle 710, and a circle 715. FIG. 7B illustrates a concave grid representation 700B of true field of vision associated with a user viewing the real-time environment instance in the virtual environment, where view of the user at true field of vision 720 comprises no warping or repositioning of elements. As shown, at reference 721, elements in the real-time environment instance appear as in the live-scene associated with the instance. At reference 722, the elements in the real-time environment instance appear closer at top and at reference 723, the elements in the real-time environment instance appear closer at bottom. FIG. 7C illustrates a concave grid representation 700C of embossing the side view of the real-time environment instance onto the first concave grid, where the triangle 705, rectangle 710 and the circle 715 are represented on Y-axis and Z-axis. As shown, when represented on the Y-axis and the Z-axis, the triangle 705 appears in original form, whereas the rectangle 710 and the circle 715 do not appear in original form. FIG. 7D illustrates a concave grid representation 700D of embossing the front view of the real-time environment instance onto the second concave grid, where the triangle 705, rectangle 710 and the circle 715 are represented on Y-axis and X-axis. As shown, when represented on the Y-axis and the X-axis, the triangle 705 does not appear in original form, whereas the rectangle 710 and the circle 715 appear in original form.

Figure 7E:
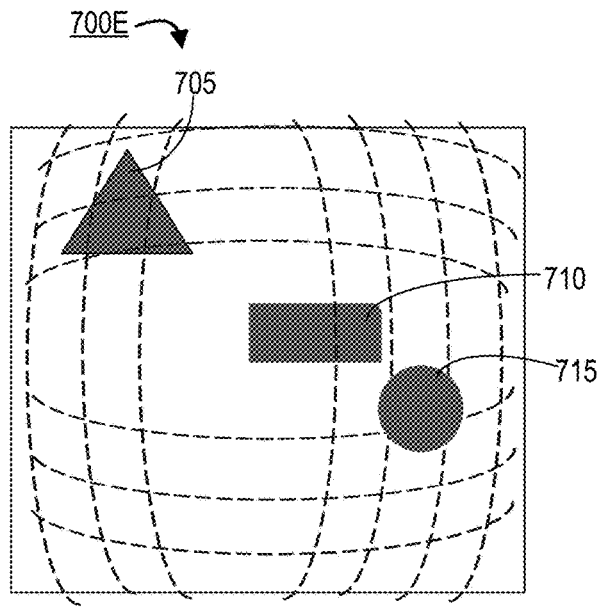
Figure 7F:
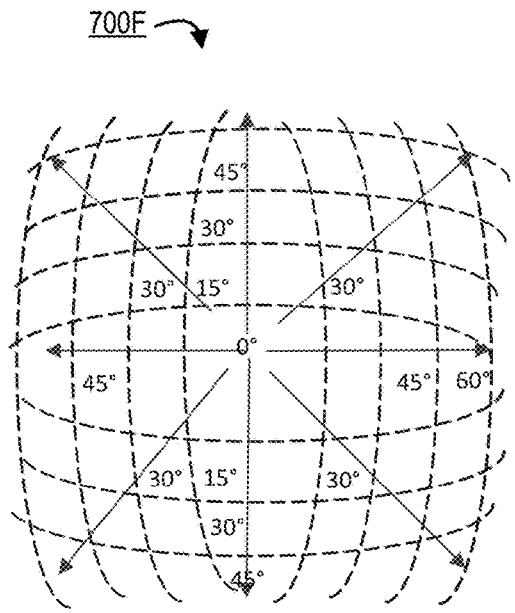

As shown in block 540, the system merges the first concave grid and the second concave grid to process the real-time environment instance. Merging of the first concave grid and the second concave grid is illustrated in FIG. 7E. FIG. 7E illustrates a concave grid representation 700E where the first concave grid 700C and the second concave grid 700D are merged, where the elements comprising the triangle 705, the rectangle 710, and the circle 715 are manipulated by the system to retain their original form. FIG. 7F illustrates a concave grid representation 700F showing different angles from the vision of the user viewing the real-time environment instance in the virtual environment. Elements that are away from the true field of vision 720 are warped at increasing higher angles.

Figure 7G:
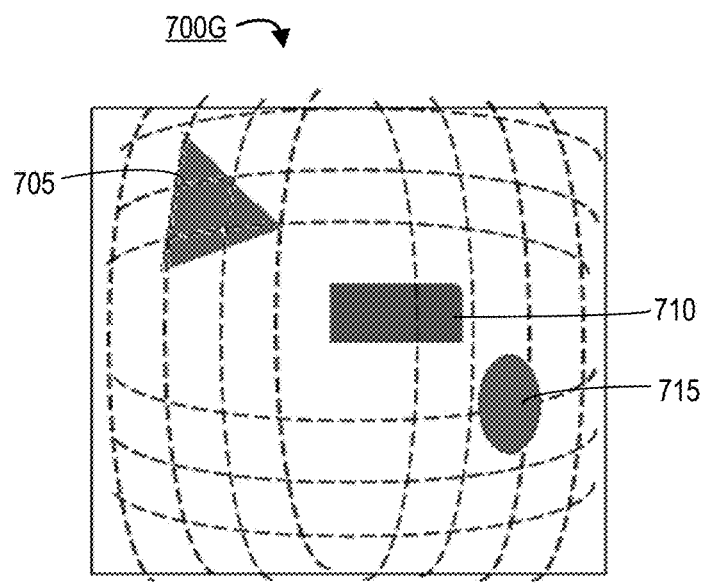

As shown in block 550, the system creates a neutral environment template based on processing the real-time environment instance as illustrated in FIG. 7G. FIG. 7G illustrates a concave grid representation 700G showing the neutral environment template comprising elements of the real-time environment instance from the true field of vision 720 of the user based on processing the real-time environment instance. The system may process the real-time environment instance from the merged concave grid illustration 700E by warping and repositioning one or more elements that are away from the true field of vision 720 as explained in FIG. 7F. As a result of warping and repositioning, the triangle 705 may look repositioned and the circle 715 may look oval, whereas the rectangle 710 may retain it's original form as shown in FIG. 7G. Processing the process the real-time environment instance from the merged concave grid illustration 700E, may further comprise performing element recognition, facial recognition, scene recognition, and/or the like associated with the one or more elements associated with the real-time environment instance. For example, the system may recognize that the real-time environment instance is associated with an office space comprising at least 4 elements, where a first element is a pen, a second element is a chair, a third element is a person 'A,' and a fourth element is a person 'B.' In some embodiments, processing of the real-time environment instance may further comprise identifying sensitive or classified elements, elements comprising one or more restricted entity logos, or the like, and eliminating such elements from the scene, thereby making the real-time environment instance a 'neutral' environment instance. In some embodiments, processing of the real-time environment instance may further comprise processing of the audio accompanying the side view and the front view captured by the one or more capturing devices. The system may process the audio and may store the processed audio as audio templates in a data repository. The system may then embed the processed audio into the neutral environment template.

As shown in block 560, the system embeds one or more preferential objects associated with the user into the neutral environment template to generate a preferred environment template. The system customizes the virtual environment based on preferences of the users gathered in block 505. Same virtual scene built from the real-time environment instance may look different to different users based on preferences of the users. For example, if a first user is viewing a real-time environment of a car dealership in a virtual environment, the system may replace a sports car with a Sports Utility Vehicle (SUV) based on the preferences of the first user and if a second user is view the real-time environment of a car dealership in the virtual environment, the system may replace the sports car with a truck based on the preferences of the second user. The one or more preferential objects that are set to replace at least one element from the real-time environment instance, are processed by the system beforehand based on the preferences of different users to generate object templates to allow for instant integration into the neutral environment template for the generation of the preferred environment template. Examples of embedding the one or more preferential objects associated with the user into the neutral environment template is illustrated in FIGS. 8A and 8B.

FIGS. 8A and 8B provide grid representations 800A and 800B of replacing one or more elements in the real-time environment instance captured by the one or more capturing devices with one or more preferential objects, in accordance with an embodiment of the invention. As shown in FIG. 8A, based on the preferences of the user, the system may identify that the user does not like the circle 715 and eliminates the circle 715 from the neutral environment instance. As shown in FIG. 8B, a star 810 is embedded in the space that was previously occupied by the circle 715. The star 810 may be processed by the system beforehand as explained above and is stored in the form of an object templates. In some embodiments, the system may generate different types of object templates to accommodate different spatial requirements of different real-time instances. In some other embodiments, the system may store different preferential objects in different object templates and may manipulate the object templates instantaneously before embedding the preferential objects into a real-time environment instance to meet the spatial requirements of the real-time environment instance. In some embodiments, the one or more preferential objects may not replace elements of the real-time environment instance and may simply be embedded into the real-time environment instance without deleting one or more elements. In some embodiments, selection of a preferred object from one or more preferred objects is based on at least one of type of the scene, preference of the user, or the like. In some such instances, the system manipulates the objects to meet the spatial requirements by performing the 'grid within a grid' rendering of the objects as explained in detail below in FIG. 9.

FIG. 9 provides a grid representation for embedding the one or more preferential objects using a 'grid within a grid' approach, in accordance with an embodiment of the invention. As shown, the block 910 comprises the preferential environment template generated by the system that meets the preferences of the user, where the preferential environment template comprises the rectangle 710, the triangle 705, and the star 810. In some embodiments, the system may additionally select two piggy banks 925 to be inserted above the rectangle 710. In such an instance, the system may manipulate the two piggy banks 925 in a second grid different from a first grid associated with the rectangle 710, the triangle 705, and the star 810 as shown in block 920. The system may additionally select two dollar symbols 935 to be inserted between the two piggy banks 925. In such an instance, the system may manipulate the two dollar symbols 935 in a third grid that is different from the first grid associated with the rectangle 710, the triangle 705, and the star 810 and the second grid associated with the two piggy banks 925 as shown in block 930. Manipulating the preferential objects in different grids using the 'grid within a grid' approach allows the system to place the preferential objects deeper into the scene with a higher negative 'Z' axis value.

In some embodiments, the one or more preferential objects embedded into the neutral environment template may not be related to other elements in the real-time environment template. In some embodiments, the one or more preferential objects embedded into the neutral environment template may be related to other elements in the real-time environment template. In some embodiments, the system may also select an audio template associated with the one or more preferred objects and may embed the audio template into the neutral environment template along with the one or more preferential objects to generate the preferential environment template.

As shown in block 570, the system instantaneously integrates the preferred environment template into a virtual reality live stream associated with the virtual environment in real-time. The system may instantaneously delivers the preferred environment template to the user based on one or more guidelines associated with the virtual environment.

FIG. 6 provides a block diagram illustrating the process of processing and integrating real-time environment instances into virtual reality live streams, in accordance with an embodiment of the invention. As shown the user 110 may submit a request to the authentication application 350 using the computing device system 400 to access a virtual environment provided by the virtual environment system 201. Upon receiving the request, the authentication application 350 authenticates the user using any of the authentication methods and also gathers one or more preferences of the user as explained in block 510. The authentication application 350 transmits the one or more preferences of the user to the one or more deep learning models 380, where the deep learning models 380 along with the depth optimizer 370 process the real-time environment instances captured by the real-time instance capture application 360 to generate the neutral environment templates as discussed in blocks 510 through 550. As shown, the object rendering application 383 generates object templates comprising the one or more preferential objects to replace at least one element in the neutral environment template and generate the preferential environment template with the help of the depth optimizer 370 to meet the spatial requirements as explained in block 560. The integration application 385 integrates the preferential environment template into a virtual reality live-stream as explained in block 570.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for processing and integrating real-time environment instances into virtual reality live streams, the system comprising:
    at least one network communication interface;
    at least one non-transitory storage device; and
    at least one processing device coupled to the at least one non-transitory storage device and the at least one network communication interface, wherein the at least one processing device is configured to:
        determine that a user is accessing a virtual environment;
        capture real-time environment instance associated with the virtual environment via one or more capturing devices, wherein the real-time environment instance comprises at least a front view and a side view;
        emboss the front view of the real-time environment instance onto a first concave grid;
        emboss the side view of the real-time environment instance onto a second concave grid;
        merge the first concave grid and the second concave grid to process the real-time environment instance;
        create a neutral environment template based on processing the real-time environment instance;
        embed one or more preferential objects associated with the user into the neutral environment template to generate a preferred environment template; and
        instantaneously stream the preferred environment template to a virtual reality live stream associated with the virtual environment in real-time.

2. The system of claim 1, wherein the at least one processing device is configured to process the real-time environment instance based on:
    identifying one or more elements in the real-time environment instance;
    optimizing at least one element of the one or more elements that is not in field of view of the user in the virtual environment; and
    eliminating at least one other element based on user preferences of the user.

3. The system of claim 2, wherein the at least one processing device is configured to embed the one or more preferential objects in space associated with the at least one other element that is eliminated based on the user preferences of the user.

4. The system of claim 3, wherein the at least one processing device is configured to embed the one or more preferential objects in the space based on performing grid oriented element warping and grid oriented element positioning.

5. The system of claim 1, wherein the at least one processing device is configured to embed the one or more preferential objects with a higher negative 'Z' axis value, where the higher negative 'Z' axis value indicates that the one or more preferential objects are embedded based on 'grid within a grid' rendering in the virtual environment.

6. The system of claim 1, wherein the at least one processing device is configured to:
    process the one or more preferential objects; and
    store the one or more preferential objects in object templates based on processing the one or more preferential objects, wherein the object templates allow for efficient integration of the one or more preferential objects into the neutral environment template.

7. The system of claim 1, wherein the one or more capturing devices comprise at least two cameras, wherein the at least two cameras are 360 degree cameras.

8. A computer program product for processing and integrating real-time environment instances into virtual reality live streams, the computer program product comprising a non-transitory computer-readable storage medium having computer executable instructions for causing a computer processor to perform the steps of:
    determining that a user is accessing a virtual environment;
    capturing real-time environment instance associated with the virtual environment via one or more capturing devices, wherein the real-time environment instance comprises at least a front view and a side view;
    embossing the front view of the real-time environment instance onto a first concave grid;
    embossing the side view of the real-time environment instance onto a second concave grid;
    merging the first concave grid and the second concave grid to process the real-time environment instance;
    creating a neutral environment template based on processing the real-time environment instance;
    embedding one or more preferential objects associated with the user into the neutral environment template to generate a preferred environment template; and
    instantaneously integrating the preferred environment template into a virtual reality live stream associated with the virtual environment in real-time.

9. The computer program product of claim 8, wherein the computer executable instructions cause the computer processor to perform the step of processing the real-time environment instance based on:
    identifying one or more elements in the real-time environment instance;
    optimizing at least one element of the one or more elements that is not in field of view of the user in the virtual environment; and
    eliminating at least one other element based on user preferences of the user.

10. The computer program product of claim 9, wherein the computer executable instructions cause the computer processor to perform the step of embedding the one or more preferential objects in space associated with the at least one other element that is eliminated based on the user preferences of the user.

11. The computer program product of claim 10, wherein the computer executable instructions cause the computer processor to perform the step of embedding the one or more preferential objects in the space based on performing grid oriented element warping and grid oriented element positioning.

12. The computer program product of claim 8, wherein the computer executable instructions cause the computer processor to perform the step of embedding the one or more preferential objects with a higher negative 'Z' axis value, where the higher negative 'Z' axis value indicates that the one or more preferential objects are embedded based on 'grid within a grid' rendering in the virtual environment.

13. The computer program product of claim 8, wherein the computer executable instructions cause the computer processor to perform the steps of:
  processing the one or more preferential objects; and
  storing the one or more preferential objects in object templates based on processing the one or more preferential objects, wherein the object templates allow for efficient integration of the one or more preferential objects into the neutral environment template.

14. The computer program product of claim 8, wherein the one or more capturing devices comprise at least two cameras, wherein the at least two cameras are 360 degree cameras.

15. A computer implemented method for processing and integrating real-time environment instances into virtual reality live streams, wherein the method comprises:
  determining that a user is accessing a virtual environment;
  capturing real-time environment instance associated with the virtual environment via one or more capturing devices, wherein the real-time environment instance comprises at least a front view and a side view;
  embossing the front view of the real-time environment instance onto a first concave grid;
  embossing the side view of the real-time environment instance onto a second concave grid;
  merging the first concave grid and the second concave grid to process the real-time environment instance;
  creating a neutral environment template based on processing the real-time environment instance;
  embedding one or more preferential objects associated with the user into the neutral environment template to generate a preferred environment template; and
  instantaneously integrating the preferred environment template into a virtual reality live stream associated with the virtual environment in real-time.

16. The computer implemented method of claim 15, wherein processing the real-time environment instance comprises:
  identifying one or more elements in the real-time environment instance;
  optimizing at least one element of the one or more elements that is not in field of view of the user in the virtual environment; and
  eliminating at least one other element based on user preferences of the user.

17. The computer implemented method of claim 16, wherein the method further comprises embedding the one or more preferential objects in space associated with the at least one other element that is eliminated based on the user preferences of the user.

18. The computer implemented method of claim 17, wherein embedding the one or more preferential objects in the space comprises performing grid oriented element warping and grid oriented element positioning.

19. The computer implemented method of claim 15, wherein the method further comprises embedding the one or more preferential objects with a higher negative 'Z' axis value, where the higher negative 'Z' axis value indicates that the one or more preferential objects are embedded based on 'grid within a grid' rendering in the virtual environment.

20. The computer implemented method of claim 15, wherein the method further comprises:
  processing the one or more preferential objects; and
  storing the one or more preferential objects in object templates based on processing the one or more preferential objects, wherein the object templates allow for efficient integration of the one or more preferential objects into the neutral environment template.

* * * * *